United States Patent
Sugegaya et al.

(10) Patent No.: US 7,082,226 B2
(45) Date of Patent: Jul. 25, 2006

(54) IMAGE DATA REPRODUCTION METHOD

(75) Inventors: Yoshinari Sugegaya, Tokyo (JP);
Kunio Nakaoka, Tokyo (JP); Hiroaki Sakai, Tokyo (JP); Masashi Mori, Tokyo (JP); Akihiko Naito, Tokyo (JP); Masaki Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 699 days.

(21) Appl. No.: 10/144,805

(22) Filed: May 15, 2002

(65) Prior Publication Data
US 2003/0072500 A1   Apr. 17, 2003

(30) Foreign Application Priority Data
Oct. 17, 2001   (JP)   ............................. 2001-318794

(51) Int. Cl.
*G06K 9/60*   (2006.01)
(52) U.S. Cl. ...................... 382/305; 382/232; 382/248; 358/403; 358/404
(58) Field of Classification Search ................ 382/233, 382/235, 248, 252, 305, 243, 148; 358/403, 358/404
See application file for complete search history.

(56) References Cited

U.S. PATENT DOCUMENTS

| | | | | |
|---|---|---|---|---|
| 5,909,505 A | * | 6/1999 | Katayama et al. | 382/164 |
| 6,005,679 A | * | 12/1999 | Haneda | 358/453 |
| 6,115,496 A | * | 9/2000 | Nguyen et al. | 382/166 |
| 6,181,746 B1 | * | 1/2001 | Hoshi | 375/240.25 |
| 6,490,407 B1 | * | 12/2002 | Niida | 386/69 |
| 6,524,631 B1 | * | 2/2003 | Dicks | 426/18 |
| 6,661,933 B1 | * | 12/2003 | Hisatomi et al. | 382/306 |
| 6,678,413 B1 | * | 1/2004 | Liang et al. | 382/181 |
| 6,718,122 B1 | * | 4/2004 | Ishii et al. | 386/112 |
| 6,775,381 B1 | * | 8/2004 | Nelson et al. | 380/54 |

FOREIGN PATENT DOCUMENTS

| | | |
|---|---|---|
| JP | 63-110870 | 5/1988 |
| JP | 1-226272 | 9/1989 |

* cited by examiner

*Primary Examiner*—Samir A. Ahmed
*Assistant Examiner*—Yosef Kassa
(74) *Attorney, Agent, or Firm*—Buchanan Ingersoll PC

(57) ABSTRACT

A duplicated part of identical images in an encoded image data master is judged to be selected. Image data to be reused is generated by adding a storage instruction to encoded image data of the duplicated part of the first identical image, and converting encoded image data of the duplicated part of the second identical image into a reuse instruction. In a reproduction process, decoded data in the encoded image data part including the storage instruction is stored in a vacant area and the decoded data is read at the point of the reuse instruction.

7 Claims, 8 Drawing Sheets

IMAGE DATA REPRODUCTION METHOD

BACKGROUND OF THE INVENTION

1. Field of the Invention

The present invention relates to an encoding processing and a decoding processing of image data.

2. Description of the Related Art

Data capacity is limited in the data processing using a storage medium such as a memory card. As the prior arts of such data processing, "Image Communications Apparatus" of Unexamined Japanese Patent Publication No. HEI 01-226272 and "Copying Device" of Unexamined Japanese Patent Publication No. SHO 63-110870 have been introduced. In these arts, while data having a feature that the data is to be used only once is being used, a part of area used for storing the data is released. Then, the released part is used for another use, which enhances the processing efficiency.

Problems to be Solved by the Invention

Recently, the storage medium, such as a memory card, has become to have a high capacity. Therefore, such storage medium is often used as an image data storage medium of, for instance, a cellular equipment. However, since the storage capacity in current use is about the extent of 128 MB, it is impossible to maintain image data of high quality for a long time, even if the data is compressed by utilizing an encoding technology. Therefore, it is desired to perform an effective data processing in the limited data capacity. Concretely, reducing a load of decoding process of image data, and making encoded image data used for the decoding processing have a high quality and a high compression rate is desired.

In the conventional art stated above, when data which can be used only once is being processed, an area having been already used out of a data storage area is released to be effectively utilized. The object of utilizing the data area which has been released in the data processing system of the conventional art is to advance a start timing of another data processing. Therefore, the object of the conventional art does not deal with the stated problems to be solved relating to the decoding process of image data.

It is one of objects of the present invention to solve the above stated problems. Namely, when a decoding process is performed for image data in a limited data capacity by using a storage medium such as a memory card, it is one of the present invention to reduce a load of decoding process of image data, and to make encoded image data used for the decoding processing have a high quality and a high compression rate.

SUMMARY OF THE INVENTION

According to one aspect of the present invention, an image data reproduction method of reproducing image data which is stored in a storage area and by which a series of image can be reproduced by way of sequentially decoding a plurality of encoded units, the image data reproduction method comprises:

while the image data is reproduced, storing reusable data obtained by a decoding process in at least one part of a vacant area which stores a unit having already been decoded in the plurality of encoded units in the storage area; and while the image data is reproduced, reading the reusable data from the vacant area in order to use read reusable data as a part of the image data.

According to another aspect of the present invention, the image data of the image data reproduction method has a feature that the image data can be reproduced only once.

According to another aspect of the present invention, the plurality of encoded units of the image data reproduction method are frame image units.

According to another aspect of the image data reproduction method of the present invention, the step of storing reusable data obtained by a decoding process in at least one part of a vacant area includes processing the reusable data and storing processed reusable data.

According to another aspect of the present invention, the image data reproduction method further comprises, when the decoding is stopped while the image data is reproduced, generating restart data used for restarting the decoding and storing generated restart data.

According to another aspect of the present invention, the image data reproduction method further comprises clearing data which can not be reproduced again out of the image data.

According to another aspect of the present invention, the image data reproduction method further comprises converting data which can not be reproduced again out of the image data to data indicating no reproduction process can be performed.

The above-mentioned and other objects, features, and advantages of the present invention will be made more apparent by reference to the following detailed description when taken in conjunction with the accompanying drawings.

DETAILED DESCRIPTION OF THE PREFERRED EMBODIMENTS

Embodiment 1

Embodiment 1 of an image data processing system according to the present invention will now be explained below. First, an image data flow at an image data reproduction processing apparatus will be described. Then, a data processing flow will be explained.

Figure 1:
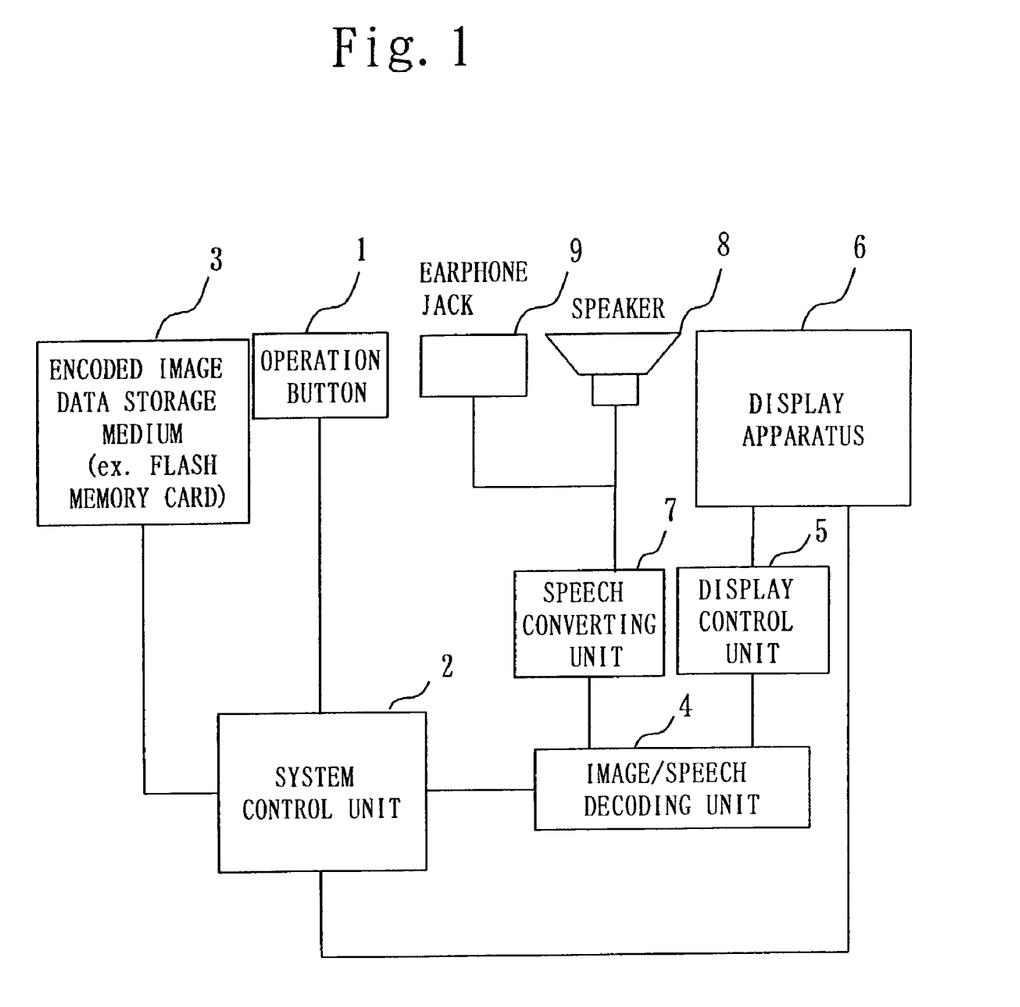
FIG. 1 shows a block diagram of an image data reproduction processing apparatus according to the present invention.

FIG. 1 shows a block diagram of the image data reproduction processing apparatus according to the present invention. An operation button 1, a system control unit 2, an encoded image data storage medium 3, an image/speech decoding unit 4, a display control unit 5, a display apparatus 6, speech converting unit 7, a speaker 8, and an earphone jack 9 are provided in the image data reproduction processing apparatus according to the present invention.

In the encoded image data storage medium 3, encoded image data is stored. When the system control unit 2 detects an image reproduction instruction sent from the operation button 1, the system control unit 2 reads image data from the encoded image data storage medium 3 and transfers the read data to the image/speech decoding unit 4. Then, the transferred image data is decoded in the image/speech decoding unit 4. The decoded image data is converted to data fit for the display apparatus 6 by the display control unit 5, and output to the display apparatus 6. Meanwhile, speech data is converted to a form fit for (audible through) the speaker 8 or the earphone jack 9 by the speech converting unit 7, and output to the speaker 8 or the earphone jack 9. The data flows as stated above in the image data reproduction processing.

Now, the process performed in the image data reproduction processing apparatus is explained. As a preprocess of image data reproduction processing, image data to be used for reusing (reusable image data) is generated in the image data reproduction processing apparatus.

Figure 2:
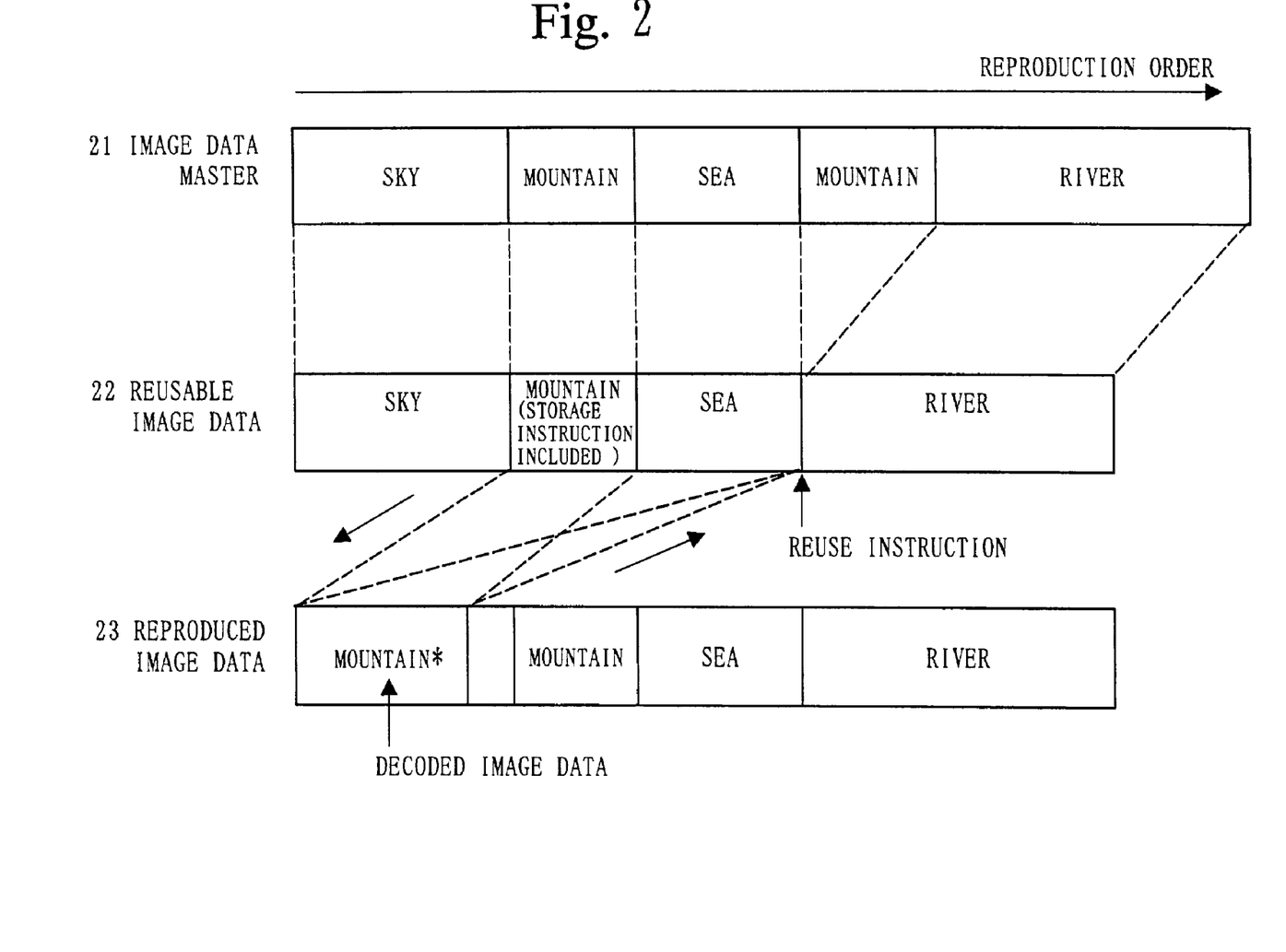
FIG. 2 shows a schematic diagram of an image data file.

FIG. 2 shows a schematic diagram of an image data file. An image data master 21 is original data of reusable image data 22 which is to be generated according to the present invention. The image data master 21 is stored in the encoded image data storage medium 3. The image data master 21 is composed of encoded image data, and can be read per unit (ex. a frame image). For example, image data used for TV broadcasting or video, or serially encoded image data, such as live images through TV broadcasting or video camera in which image data is not intermittently stored but serially stored, can be the image data master 21. In the example of FIG. 2, each image data is stored in order of "SKY"→"MOUNTAIN"→"SEA"→"MOUNTAIN"→"RIVER". The minimum unit for data reading is a frame (screen), and each image data such as "SKY" or "MOUNTAIN" is composed of a single frame or serial plural frames.

The reusable image data 22 is generated by the preprocess stated below. This reusable image data 22 is also to be stored in the encoded image data storage medium 3, and to be used in a reproduction process stated later.

Figure 3:
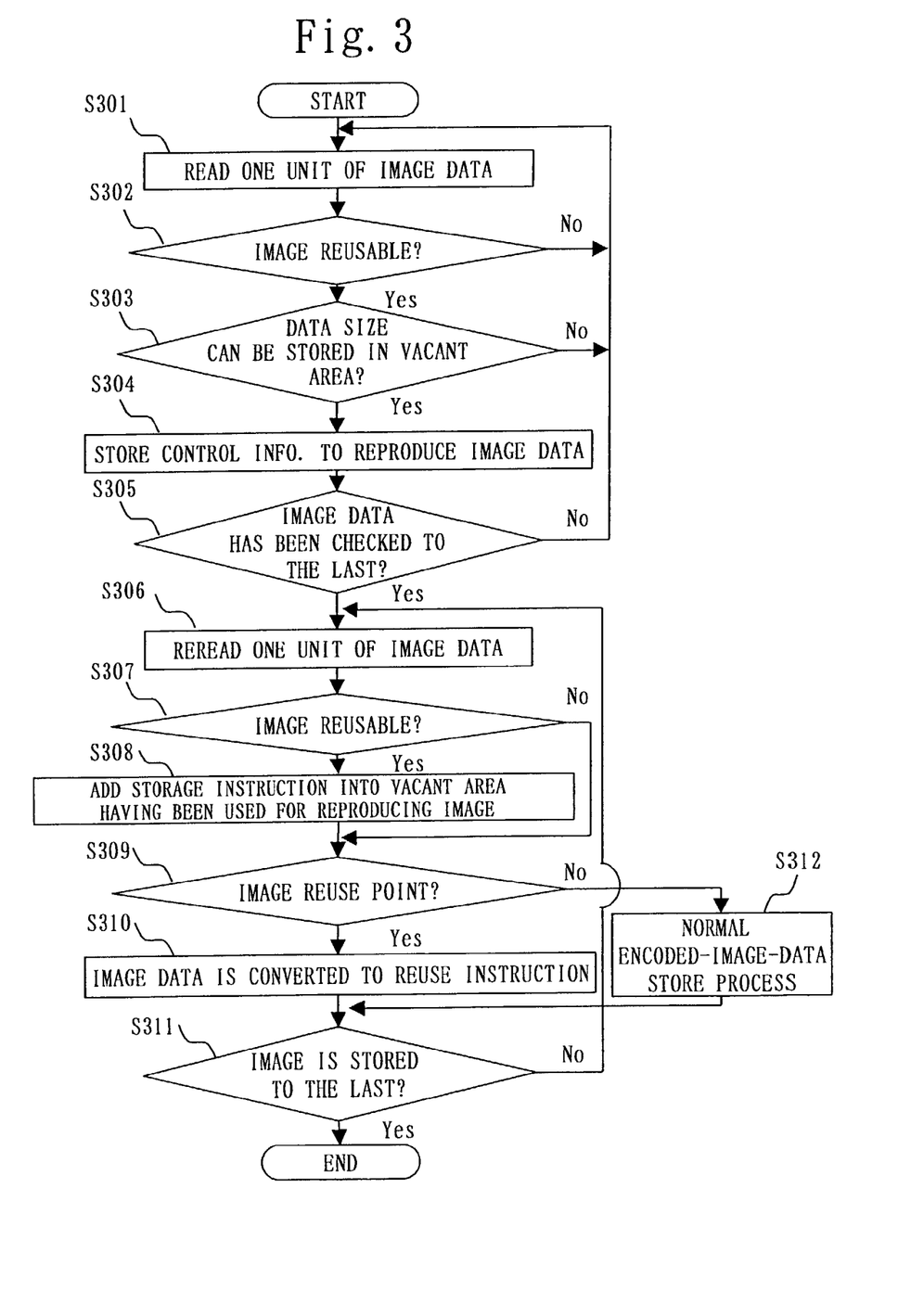
FIG. 3 is a flowchart showing a creating process of the reusable image data.

FIG. 3 is a flowchart showing a creating process of the reusable image data. This creating process is composed of processes of two stages. In the first stage process, it is judged whether each unit of the image data master 21 can be reused or not, and whether decoded data of each unit can be stored in a vacant area or not. Then, control information is generated based on the judging result. In the second stage process, the reusable image data 22 is created based on the control information generated in the first stage process.

The first stage process (from S301 to S305) will now be explained. A unit (ex. a frame image unit) of image data is read from the image data master 21 stored in the encoded image data storage medium 3 at S301. The following process is performed for each unit of the image data.

First, it is judged whether the read unit can be reused or not at S302. Namely, it is checked whether or not there is identical data in the past processed image data with the read unit. Comparing an old image with the current image (the read unit), if color data of each pixel composing the old image and the current image correspond each other at the rate of a specific value or greater than the specific value (ex. equal to or greater than 98%), the judgement that there is the identical data in the past with the current image data can be concluded. In performing the comparison, a zoom rate, a whole screen gap, or a color compensation of the whole screen is taken into consideration.

Further, it is judged whether the size of decoded data of the read unit can be stored in a used data area (vacant area) or not at S303. The used data area will be explained later. The amount of image data which has been judged to be identical is compared with the amount of used area in which data reproduction has been finished. When the used area is larger than the amount of identical image data, it is concluded that the decoded data of the read unit can be stored in the used area.

In the case that both the conditions of S302 and S303 are satisfied, control information for reconstructing the image data is generated and stored at S304. The control information indicates an area for storing the decoded image data. Concretely, the last storage location and an elapsed time since the image starting are stored in order to create a storage location (address), storage starting point (time), storage finishing point (time), and a reuse point (time). The control information can be stored in a temporary area (memory or disk), because the control information is still the medium data in a series of processing. In the case that at least one of the conditions of S302 and S303 is not satisfied, the control information is not generated. These processes are repeated to the last unit of the image data at S305.

In the image data master 21 of FIG. 2, since the image of "MOUNTAIN" is repeated twice, it is judged that the part of the second "MOUNTAIN" can be created based on the reusing. Then, being identical or not is checked for each frame unit.

Then, the second stage process (from S306 to S312) is performed. A unit (ex. a frame image unit) of image data is reread from the image data master 21 at S306. Then, the following process is performed for each unit of the image data.

Based on the control information, which is for reproducing image data, generated in the process stated above, it is judged whether the read unit can be reused or not at S307. Concretely, it is checked whether or not the elapsed time since the image starting corresponds to the storage starting point in the control information. In the case of the read unit being reusable, a storage instruction is added to the corresponding unit (in this case, the first "MOUNTAIN") in the reusable image data 22 at S308. The storage instruction is a command to store the decoded image data in a vacant area. The vacant area is a releasable area because this area was used for storing the encoded data which had already been reproduced. As a method of adding the storage instruction, for instance, control data is embedded at the top of the image data to be stored. The control data is embedded at the top of the data to be stored and at the location where the stored data is reused. Since the speed of data read process is much faster than the speed of image reproduction process, it is tolerable to have a gap for the control data or to perform an image storing process and an image reusing process. Generally, as the image data is independent of each other per frame unit or per plural frame units, it is possible to perform an inserting process or a converting process at the border of one unit of the image data.

It is also judged whether the read unit is the reuse point for the image or not at S309. Concretely, the elapsed time since the image starting is compared with the reuse point in the control information. When the elapsed time corresponds to the reuse point, the read unit is judged to be the reuse point. After having been judged that the read unit corresponds to the reuse point, the unit included in the reusable image data 22 corresponding to the read unit is converted to a reuse instruction. The reuse instruction is a command to reuse the data stored in the vacant area. The reuse instruction to which the reusable image data 22 is converted is composed of an ID indicating the reuse instruction and point (address) information for reusing.

When the read unit is not the reuse point, a normal storing process of encoded image data is performed at S312. Namely, the read unit is included in the reusable image data 22 as in the form of encoded data. The above process is repeated to the last unit at S311. In this way, the reusable image data 22 is generated (reconstructed).

Based on the above process, a storage instruction to write the decoded image data to the vacant area is added to the first "MOUNTAIN" part in the reusable image data 22 as shown in FIG. 2. Then, the encoded image data at the second "MOUNTAIN" part is deleted. A reuse instruction is added which commands to reuse the image data written in the vacant area (the decoded image data at the first "MOUNTAIN" part), in place of the deleted image data.

Figure 4:
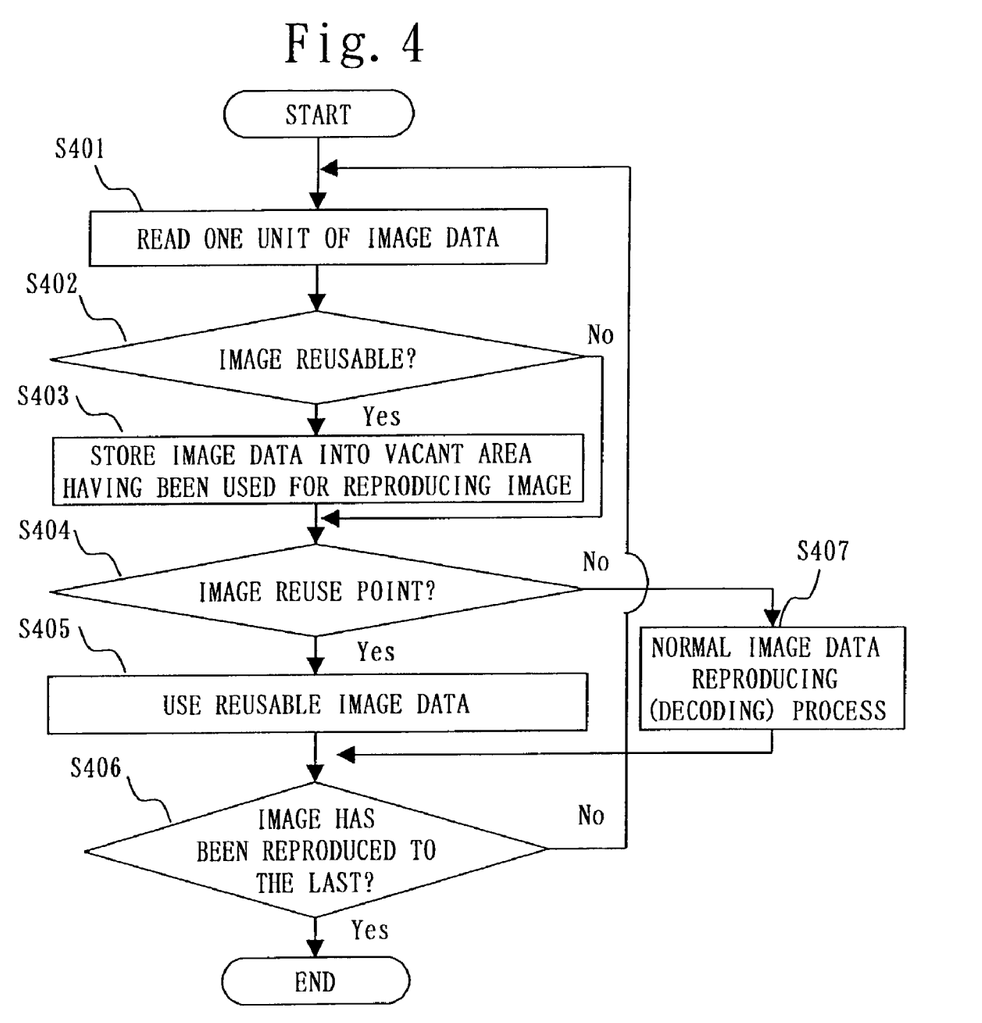
FIG. 4 is a flowchart showing a reproduction process of image data.

Now, with reference to a flowchart of FIG. 4, the reproduction process of the image data is explained. In this process, the reusable image data 22 generated in the above process is reproduced. The reproduction process of the image data is connectively performed with the system control unit 2 and the image/speech decoding unit 4. The image/speech decoding unit 4 only selects which way to perform decoding of input data or outputting a through output without decoding the input data. The system control unit 2 outputs an instruction on the selection.

The data 23 in FIG. 2 is data after the image reproduction. This reproduced image data 23 can be obtained by the reproduction process. The reproduced image data 23 is the data in the area where the reusable image data 22 has been stored. Namely, the reproduced image data 23 can be obtained by converting a part of the reusable image data 22 stored in the encoded image data storage medium 3 in the reproduction process.

First, one unit (ex. a frame image unit) of image data is read from the reusable image data 22 at S401. Then, it is judged whether the read unit can be reused or not. Concretely, it is checked whether the storage instruction is included in the read unit or not at S402. When the storage instruction is included in the read unit, the encoded image data (the read unit) is decoded and written (stored) in a vacant area as a decoded image data. The storage area (vacant area) is decided based on the storage instruction. The decoding process is performed for each unit of the image data as shown in the processes from S401 to S407. The process of S403 is practically performed after a plenty of image data units have been processed and the process of S407 has been executed several times.

By the above process, the image data "MOUNTAIN*" is stored in the left part of the reproduced image data 23 where is the vacant area. The image data "MOUNTAIN*" is obtained by decoding the encoded image data of "MOUNTAIN" in the reusable image data 22.

It is judged whether the read unit is the reuse point or not. Concretely, it is checked whether the read unit is the reuse instruction or not. When the read unit is the reuse instruction, decoded image data is read from the vacant area based on the reuse instruction at S405. If the read unit is not the reuse instruction, a normal decoding process of image data (reproduction process) is performed at S407. The above process is repeated to the last unit (S406).

By performing the above process, before reproducing the image data of "RIVER" in the reusable image data 22, the image data of "MOUNTAIN*" in the reproduced image data 23 is read and output. Thus, according to the present invention, the same output result as that of the normal reproduction process of the image data master 21 can be obtained by the reproduction process of the reusable image data 22.

Therefore, according to the image data process system of Embodiment 1, it becomes unnecessary to perform the decoding process of image data to be reused. Namely, the load of the decoding process can be reduced. Further, the processor can be effectively utilized for other process, such as a preprocess of the next image data.

Embodiment 2

In Embodiment 1, the decoded image data is reused in intact. In Embodiment 2, processed image data is stored in a vacant area and the stored processed image data is reused. Namely, in order to enhance the efficiency of the image data reuse and to enable the reuse, the image data is processed in the present Embodiment.

Figure 5:
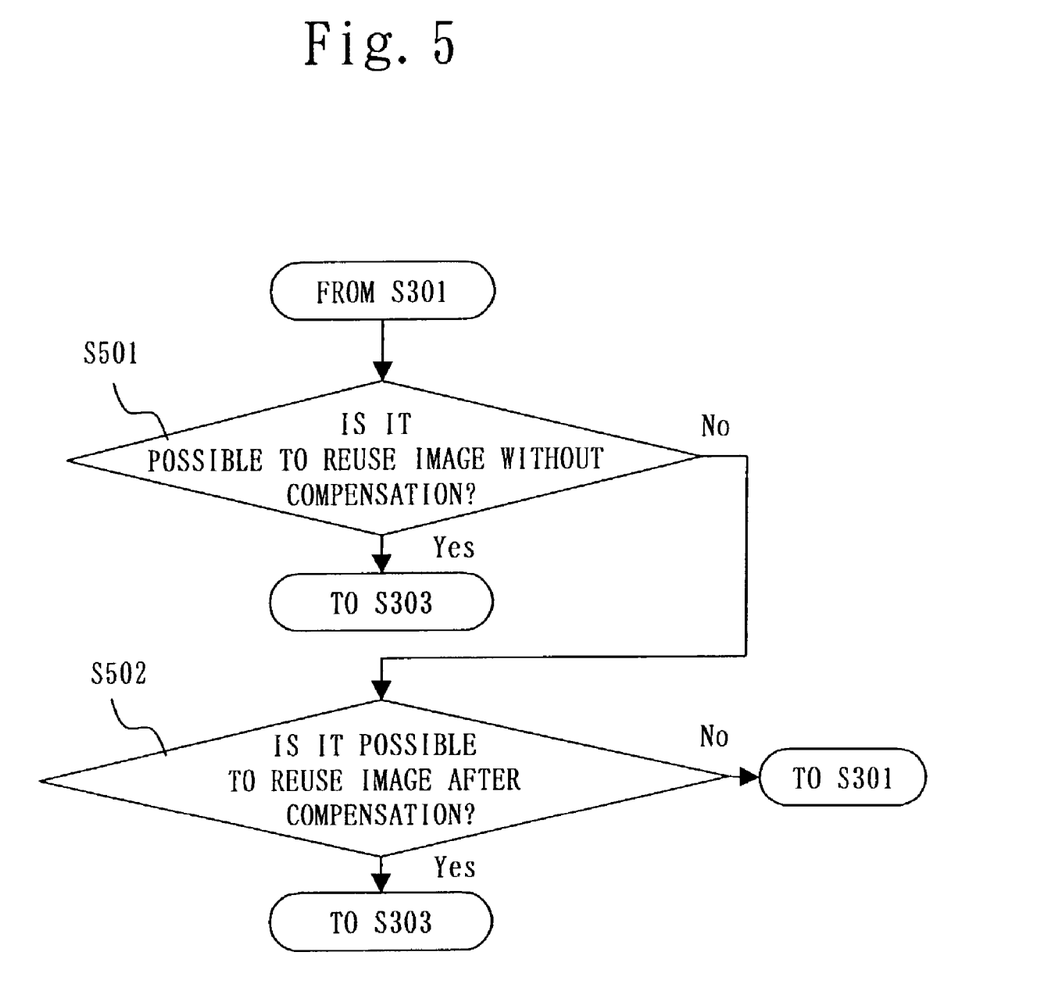
FIG. 5 is a process flow showing a feature according to Embodiment 2.

FIG. 5 shows a feature process according to Embodiment 2. Concretely, the process of S302 in FIG. 3 is replaced with the process in FIG. 5. As shown in FIG. 5, it is judged whether the image can be reused or not (identical image or not). If this judgment is performed on the assumption that processing is performed for the differential of the image data which is judged not to be reused, the reuse rate can be increased. Namely, for example, when the condition of reuse is being identical of equal to or greater than 98%, compensation is performed for data having an identical rate of 95% through 98%. By dint of this compensation, the identical rate of the data is increased to be 98% or greater than 98%, and the data of increased identical rate is stored for the reuse.

Thus, the range of data to be reused can be enlarged according to the image data processing system of Embodiment 2. Particularly, in the encoding system using image data composed of a picture of whole screen having a low data compression rate and a differential data, it is possible to reduce the data amount of the differential. Therefore, encoded image data of a high quality and a high compression rate can be obtained.

Embodiment 3

Figure 6:
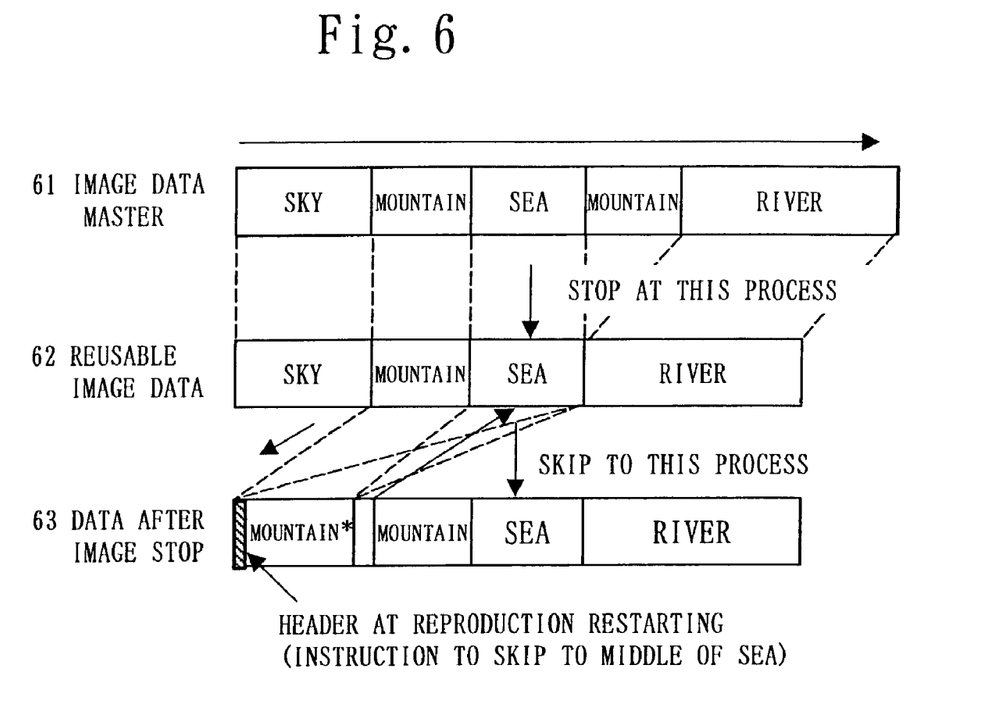
FIG. 6 shows a file image according to Embodiment 3.

In Embodiment 3, when a decoding process (reproduction process) of image data is stopped halfway, image data reproduced close to the stopping location is stored as a picture of whole screen. Then, in addition, relating differential data is compensated to be also stored. The whole screen picture and the differential data are treated as the reuse data. The whole screen data and the differential data are written in a reuse data area (data area where reproduction has been finished), and control data indicating to refer to the reuse data is written at the top of the file. The file image is illustrated as shown in FIG. 6.

Figure 7:
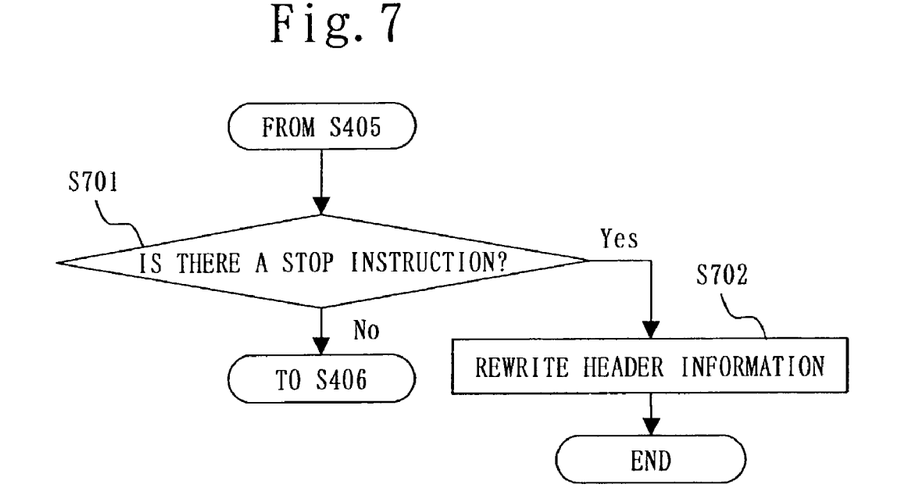
FIG. 7 is a process flow showing a feature according to Embodiment 3.

FIG. 7 shows a feature process according to Embodiment 3. Concretely, the process of FIG. 7 is added after the process S405 of FIG. 4.

According to the image data processing system of Embodiment 3, the reproduction can be stopped at an optional timing and can be restart at an optional timing regardless of the location of the whole screen picture. Therefore, it is possible to reduce the ratio of the picture of whole screen having a low data compression rate in the image data. Consequently, in the case of reproducing encoded image data, image data of a high quality and a high compression rate can be obtained on the assumption that the reproduction process is temporarily stopped and restarted.

Embodiment 4

Image data which can not be reproduced again at the time of the reproduction process finish according to Embodiment 1 is cleared in Embodiment 4.

Figure 8:
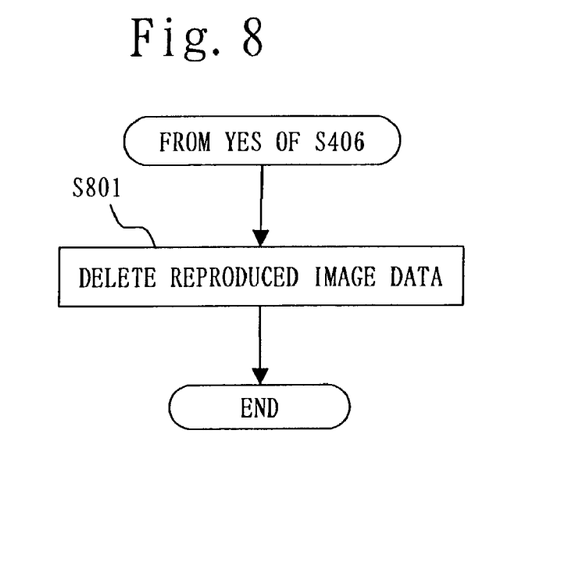
FIG. 8 is a process flow showing a feature according to Embodiment 4.
Figure 9:
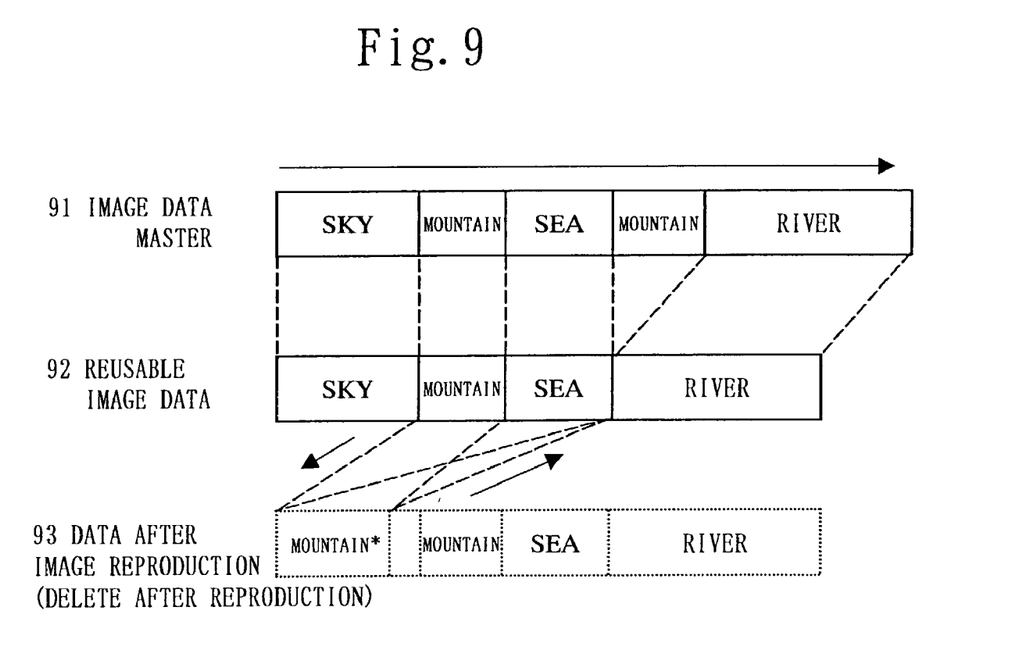
FIG. 9 shows a file image according to Embodiment 4.

FIG. 8 shows a feature process according to Embodiment 4. Concretely, the process of FIG. 8 is added after the process S406 of FIG. 4. The file image is shown in FIG. 9.

According to the image data processing system of Embodiment 4, it is possible to avoid the failure of selecting image data which can not be reproduced again as a reproduction object. Then, as the state for storing the next image data comes, the recording process and the reproduction process of image data can be effectively performed.

Embodiment 5

Image data which can not be reproduced again at the time of the reproduction process finish according to Embodiment 1 is converted to image data indicating no reproduction process can be performed, in this Embodiment 5.

Figure 10:
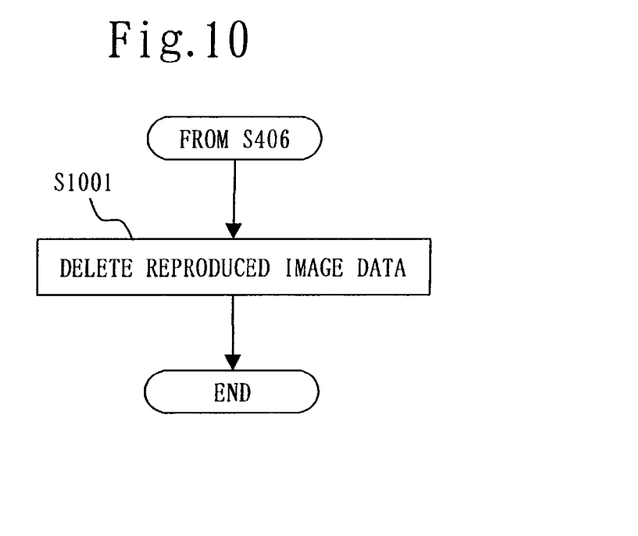
FIG. 10 is a process flow showing a feature according to Embodiment 5.
Figure 11:
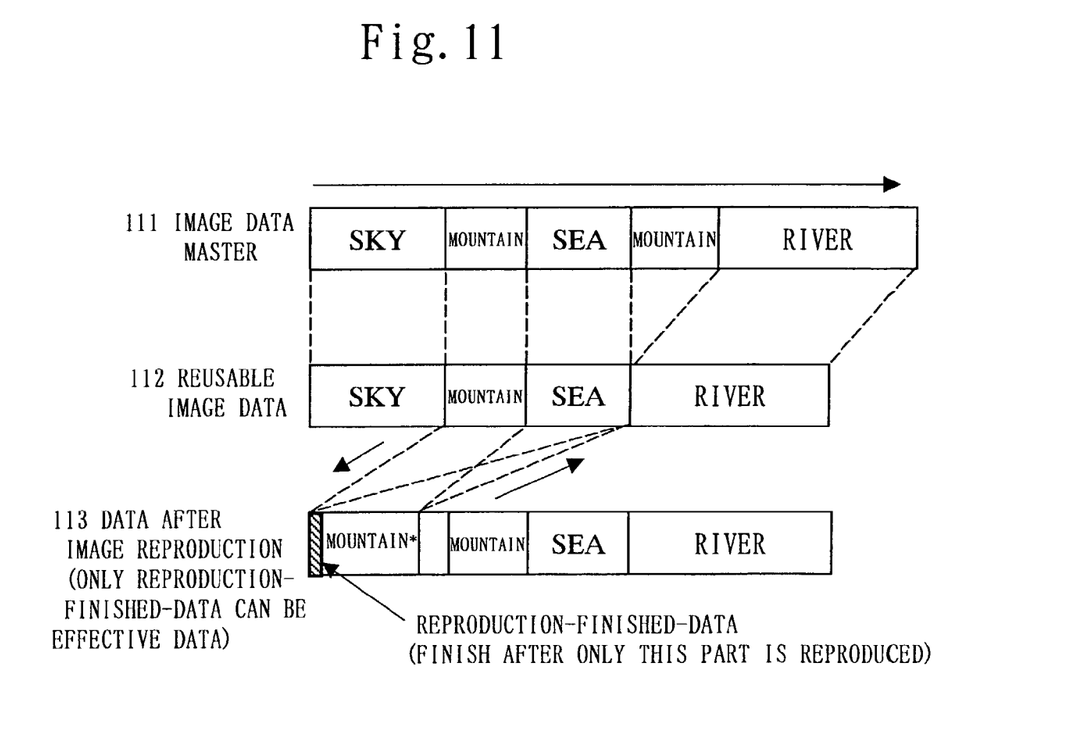
FIG. 11 shows a file image according to Embodiment 5.

FIG. 10 shows a feature process according to Embodiment 5. Concretely, the process of FIG. 8 is added after the process S406 of FIG. 4. The file image is shown in FIG. 11

According to the image data processing system of Embodiment 5, even when image data which can not be reproduced again is selected as a reproduction object, it is possible to judge that the selected image data can not be reproduced. Then, as an area for storing the next image data can be largely secured, the recording process and the reproduction process of image data can be effectively performed.

EFFECTS OF THE INVENTION

The first advantage of an image data reproduction method according to the present invention is that, in image data having a feature the reproduction processing is performed only once, a load of decoding processing can be reduced because it is unnecessary to perform the decoding processing of image data to be reused. Therefore, the processor can be utilized for other process, such as a preprocess of the next image data.

The second advantage of an image data reproduction method according to the present invention is that as the image data to be reused can be increased and the data compression rate can be enhanced, encoded image data of a high quality and a high compression rate can be obtained.

The third advantage of an image data reproduction method according to the present invention is that as the reproduction can be stopped at an optional timing and can be restart at an optional timing regardless of the location of the whole screen picture, it is possible to obtain encoded image data having a low ratio of whole screen picture whose compression rate is small, and having a high quality and a high compression rate.

The fourth advantage of an image data reproduction method according to the present invention is that it is possible to avoid mistakenly instructing to reproduce the image data which can not be reproduced, and it is also possible to increase the process efficiency as the data storage area is released.

The fifth advantage of an image data reproduction method according to the present invention is that even when an instruction to reproduce the image data which can not be reproduced again is mistakenly given, it is possible to instantly judge that the reproduction has already been finished.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. An image data reproduction method of reproducing image data which is stored in a storage area and by which a series of images can be reproduced by way of sequentially decoding a plurality of encoded units, the image data reproduction method comprising the steps of:
   while the image data is reproduced, determining if image data is identical to past processed image data and storing the identical data as reusable data, obtained by a decoding process, in at least one part of a vacant area which stores a unit having already been decoded in the plurality of encoded units in the storage area; and
   while the image data is reproduced, reading the reusable data from the vacant area in order to use read reusable data as a part of the image data.

2. The image data reproduction method of claim 1, wherein the image data has a feature that the image data can be reproduced only once.

3. The image data reproduction method of claim 1, wherein the plurality of encoded units are frame image units.

4. The image data reproduction method of claim 1, wherein the storing reusable data obtained by a decoding process in at least one part of a vacant area further includes processing the reusable data and storing processed reusable data.

5. The image data reproduction method of claim 1 further comprising, when the decoding is stopped while the image data is reproduced, generating restart data used for restarting the decoding and storing generated restart data.

6. The image data reproduction method of claim 1 further comprising clearing data which can not be reproduced again out of the image data.

7. The image data reproduction method of claim 1 further comprising converting data which can not be reproduced again out of the image data to data indicating no reproduction process can be performed.

* * * * *